UNITED STATES PATENT OFFICE.

FRANCIS E. J. LITOT, OF WILKINSBURG, PENNSYLVANIA.

SOLDERING COMPOUND.

1,224,941.     Specification of Letters Patent.     Patented May 8, 1917.

No Drawing. Original application filed March 22, 1915, Serial No. 16,253. Divided and this application filed June 5, 1916. Serial No. 101,863.

*To all whom it may concern:*

Be it known that I, FRANCIS E. J. LITOT, a resident of Wilkinsburg, in the county of Allegheny and State of Pennsylvania, have invented a new and useful Improvement in Soldering Compounds, of which the following is a specification.

This invention relates to a soldering composition for soldering aluminum either to itself or to other metals. Heretofore it has been found impracticable to solder aluminum effectively, that is, so that the soldered joint will withstand the ravages of time and changes of temperature and moisture.

The present invention has for its object a soldering composition by means of which aluminum parts may be soldered to each other or to other metals, and in which the soldered connection is both strong and durable. It is also an object of the invention to provide a soldering compound which has a sufficiently low melting point to prevent the aluminum pieces being soldered from becoming annealed because of too high heat being required to melt the solder.

In its preferred form the soldering composition consists of an alloy of zinc, lead and tin in certain definite proportions. I have discovered that zinc alone forms a good solder for aluminum articles, but its melting point is so high that the ordinary workman is liable to overheat the aluminum, particularly if it is in the shape of thin sheets, and thus seriously injure the same. To overcome this I alloy with the zinc, lead and tin, and thus reduce the melting point, but without destroying the effectiveness of the solder. The preferred proportions in which the zinc, tin and lead are combined to form an effective and durable solder for aluminum are 25 parts of zinc, 45 parts of tin, and 55 parts of lead. This composition forms a solder which is very fluid and has a low melting point and is therefore suitable for soldering aluminum. At the same time it forms a joint which has great endurance under either mechanical strains or weathering. Its melting point is so low that danger of injuring the aluminum during soldering is entirely avoided, even in the hands of an unskilled workman.

The proportions above given are susceptible of some variation without affecting the qualities of the soldering compound, but any material deviation from the proportions given will impair the usefulness of the compound for soldering aluminum. The enduring qualities of the soldered joint are best when the lead and tin are kept relatively low, and hence in making up the solder the proportion of lead and tin will be such as to merely reduce the melting point of the compound to a safe limit below that of the heat which would injure the particular metal being soldered.

I am aware that solders composed of zinc, lead and tin have been used for soldering a number of metals, but have found that a solder compounded from these elements will not serve as a durable solder for aluminum unless the ingredients are present in approximately definite relative proportions.

If desired, the tin may be supplied in some form of tin alloy, such as phosphor tin, which also serves to lower the melting point of the zinc.

This application is a division of my application filed March 22, 1915, Serial No. 16,253.

What I claim is:—

1. A soldering compound, containing zinc, tin and lead, the tin and lead being each not less than the zinc, so as to reduce the melting point of the zinc to a safe limit below the heat which would injure the parts being soldered.

2. A soldering compound, containing zinc, tin and lead in the approximate proportions of 25 parts zinc, 45 parts tin, and 55 parts lead.

In testimony whereof, I have hereunto set my hand.

FRANCIS E. J. LITOT.

Witnesses:
    GLENN H. LERESCHE,
    A. E. JOHNSON.